April 3, 1934.  J. H. PAYNE  1,953,819

PRESSURE MEASURING DEVICE

Filed April 30, 1930  4 Sheets-Sheet 1

Inventor:
John H. Payne,
by Charles W. Tullo
His Attorney.

April 3, 1934.    J. H. PAYNE    1,953,819
PRESSURE MEASURING DEVICE
Filed April 30, 1930    4 Sheets-Sheet 2
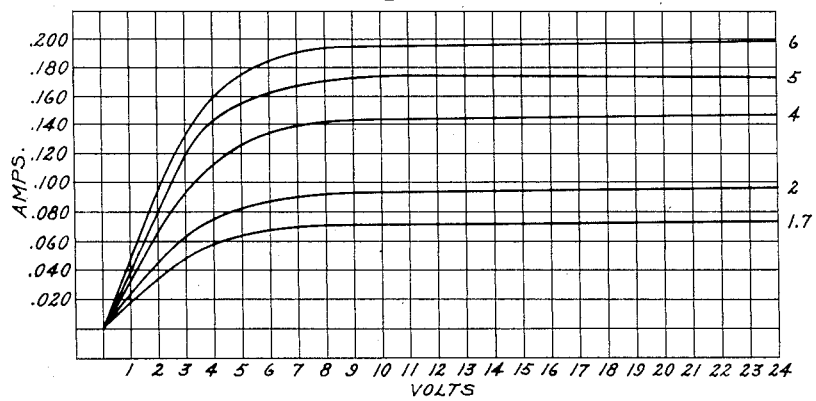
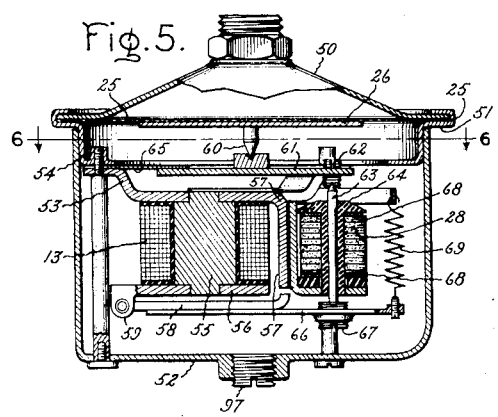
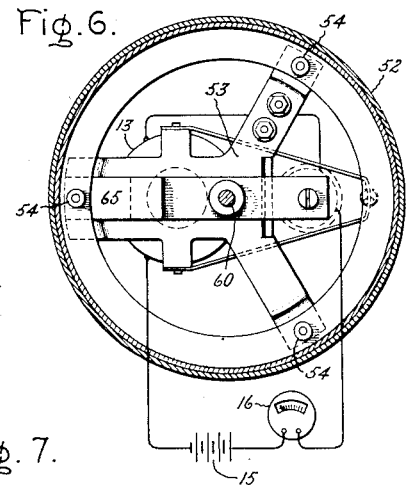
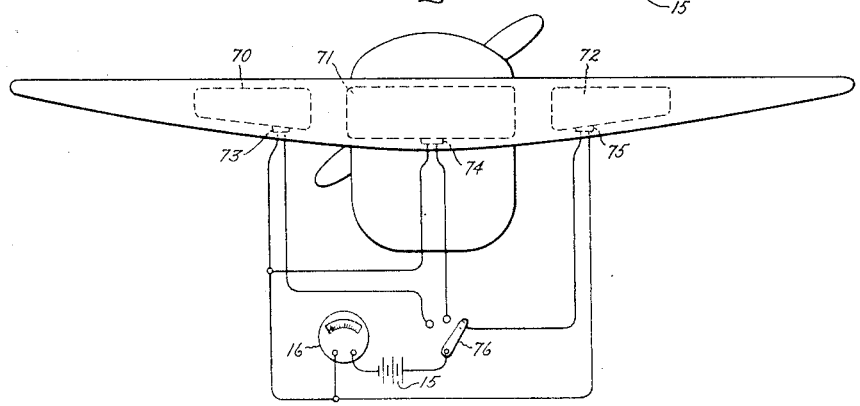
Inventor:
John H. Payne,
by Charles E. Tullar
His Attorney.

April 3, 1934.                J. H. PAYNE                 1,953,819
                        PRESSURE MEASURING DEVICE
              Filed April 30, 1930          4 Sheets-Sheet 3

Inventor:
John H. Payne,
by Charles E. Tullar
His Attorney.

April 3, 1934.  J. H. PAYNE  1,953,819
PRESSURE MEASURING DEVICE
Filed April 30, 1930  4 Sheets—Sheet 4

Inventor:
John H. Payne,
by Charles E. Tullar
His Attorney.

Patented Apr. 3, 1934

1,953,819

UNITED STATES PATENT OFFICE 1,953,819

PRESSURE MEASURING DEVICE

John H. Payne, Ballston Spa, N. Y., assignor to General Electric Company, a corporation of New York Application April 30, 1930, Serial No. 448,722

4 Claims. (Cl. 177—351)

My invention relates to pressure measuring devices, and in particular to electrically operated devices for measuring fluid pressures. The object of my invention is to provide a compact, rugged, inexpensive, electrically operated pressure measuring unit which may be connected to an electrical measuring instrument and source of supply and calibrated to give consistent high accuracy regardless of wide variations in the voltage of the source of supply. The invention is applicable to numerous applications, but is particularly applicable where it is desirable to avoid the use of piping in connection with fluid-measuring systems.

An early form of the invention is described in my application, Serial No. 301,018, filed August 21, 1928. The present application is in part a continuation of such earlier application, and includes various improvements.

In carrying my invention into effect I provide an electromagnetic regulating unit for directly balancing the pressure or force to be measured. This electromagnetic regulating and pressure-balancing unit is connected in an electric circuit containing a measuring instrument which may be of the indicating, recording, or integrating type, and calibrated in accordance with the pressure of force being measured.

Figure 8:
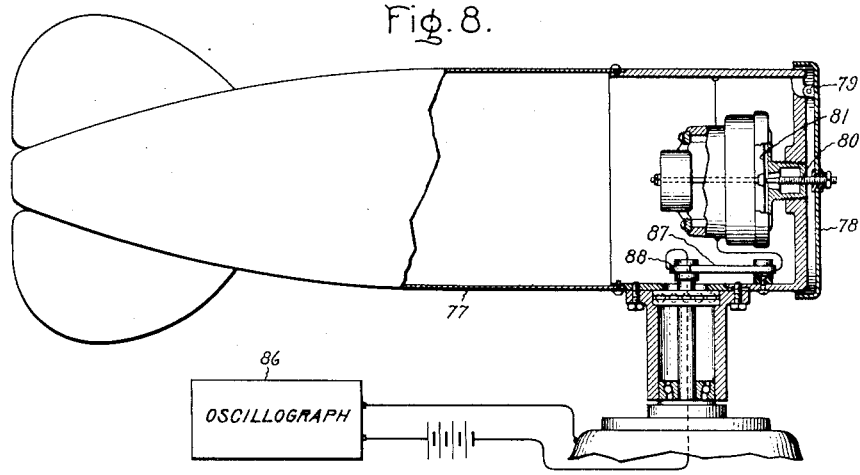
Figure 10:
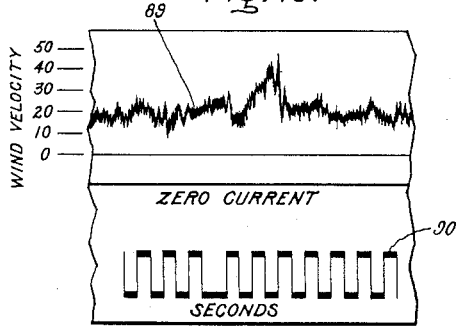
Figure 9:
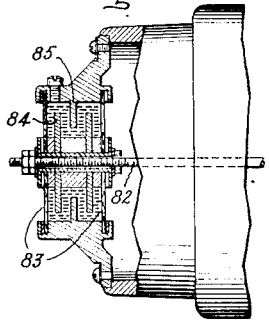
Figure 11:
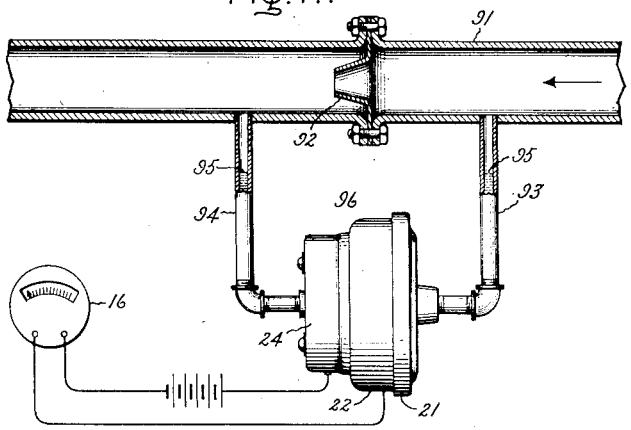
Figure 12:
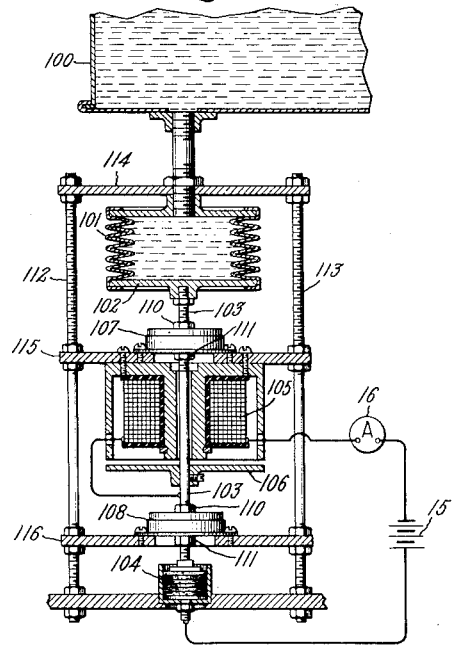
Figure 13:
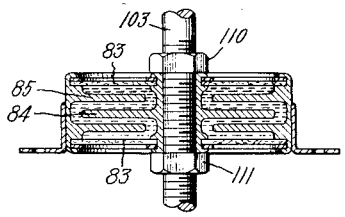

The features of my invention which are believed to be novel and patentable will be pointed out in the claims appended hereto. For a better understanding of my invention reference is made in the following description to the accompanying drawings, Figs. 1 and 2 of which illustrate schematic diagrams explanatory of the principles employed in my invention. Fig. 3 is a sectional view through a commercial form of electromagnetic pressure-balancing regulating units. Figs. 3a and 3b illustrate the manner of adjusting the effective area of the diaphragm of the device of Fig. 3 to adapt it to different fluid pressures. Fig. 3c is a plan view of the part 44 Fig. 3. Fig. 4 shows curves plotted between the voltage of the source of supply and the current in the measuring circuit at different fluid pressures, illustrating that the calibration of the apparatus is independent of wide variations in the voltage of the source of supply. Fig. 5 shows a sectional side view of another form of my electromagnetic pressure-balancing regulating unit having certain structural advantages over the form shown in Fig. 3. Fig. 6 shows a sectional plan view of the device of Fig. 5 taken on line 6—6. Fig. 7 illustrates the application of my invention as a gasoline gauge for aeroplanes. Fig. 8 illustrates the application of the invention as a wind-velocity recorder. Fig. 10 is a record obtained by the apparatus of Fig. 8. Fig. 9 is a sectional view of a damper used with the form of the invention shown in Fig. 8. Fig. 11 illustrates the application of my invention for measuring the flow of fluids. Fig. 12 illustrates the form of my invention described in my earlier application Serial No. 301,018 and Fig. 13 shows the details of the damper mechanism used with the device of Fig. 12.

Figure 1:
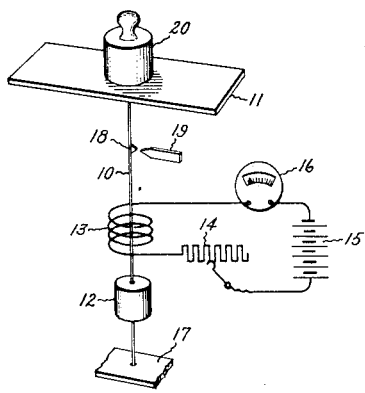

In Fig. 1 I have represented a vertical rod 10 carrying a platform 11 at its upper end and an iron core 12 secured to the rod below the platform. The iron core or armature forms a portion of the solenoid or electromagnet, the coil 13 of which is positioned so as to produce an upward pull on the core when the solenoid is energized. The coil is connected in an electric circuit, including a regulating resistance 14, a source of supply 15, and an electrical measuring instrument 16. It is assumed that the rod is supported on a resilient abutment at 17. With no weight on the platform 11 and no current in the coil 13 the rod 10 will assume an axial position of equilibrium at some position which may be indicated by an indicator 18 on the rod and a stationary marker 19. If now we place a weight 20 on the platform the rod will be depressed slightly and may be brought back to the original position by energizing the coil 13 and adjusting the regulator 14 until the upward pull of the solenoid equals the downward force produced by the weight 20. A variation in the weight 20 will require a further adjustment of the resistance 14 to vary the pull of the solenoid in order to maintain the original position of the rod, the current increasing with the increase in weight. The current in the solenoid circuit thus becomes proportional to the added weight 20, and the instrument 16 may be calibrated directly in pounds.

Figure 2:
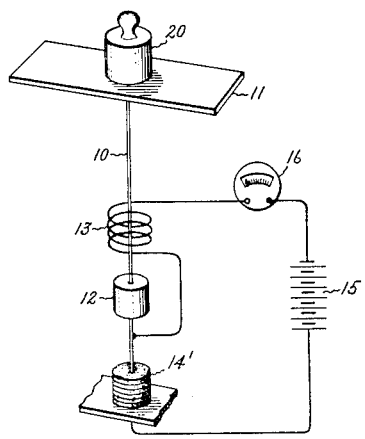
Figure 3:
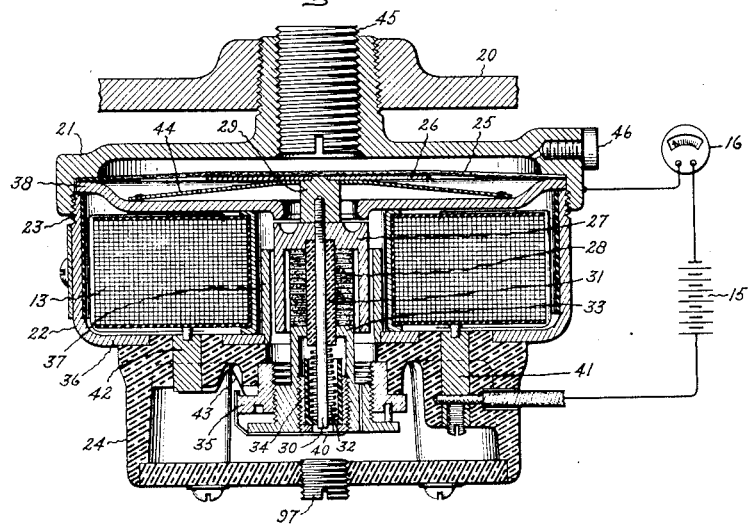
Figure 3A:
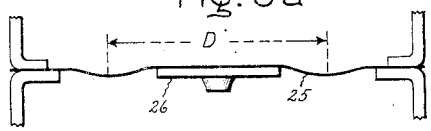
Figure 3B:
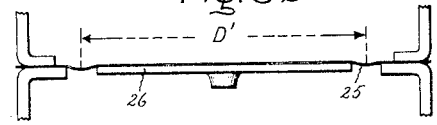
Figure 3C:
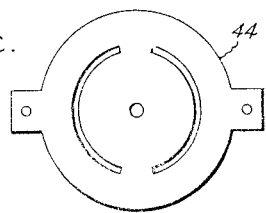

Fig. 2 illustrates the scheme as modified and employed in my invention. Parts similar to those of Fig. 1 are indicated by like reference characters. Fig. 2 differs from the scheme of Fig. 1 in that the manually adjustable external resistance 14 employed in Fig. 1 is replaced by a carbon pile 14' placed beneath and supporting the rod 10. The electromagnet and the current regulator of Fig. 1 are thus combined in a single compact unit entirely automatic in its operation in the scheme of Fig. 2. This electrical regulating and balancing unit may be said to have no moving parts since instead of any appreciable axial movement of the rod we have a pressure difference on the carbon pile. In the commercial form of my invention the total axial movement of the parts supported by the carbon pile does not exceed .003 inch, a feature which is of considerable importance in that it results in a low-cost compact noiseless device of high accuracy and long life. The operation is automatic since any increase in the weight 20 compresses the carbon pile, decreases its resistance, and raises the current in the solenoid. The increased upward pull of the solenoid decreases the pressure on the carbon pile until the upward pull of the solenoid is just sufficient to balance the weight 20 less the weight which may be supported by the carbon pile. The compression area of the carbon pile is made relatively small so that only a small percentage of the total weight 20 is required to operate it. This is so small that even large differences in the pressure-resistance characteristics of the pile have very little effect on the accuracy of the device. In practice, from about 95 to 99.5 percent of the weight or pressure is balanced by the solenoid depending upon the design. The remainder is required to compress the carbon pile. Assuming a change of 10% in the pressure-resistance-characteristics of the carbon pile, which will rarely if ever occur, the greatest change in overall accuracy would be only 10% of 5% or one-half of one percent. Thus it will be seen that the force to be measured slightly predominates over the magnetic pull to the extent necessary to compress the carbon pile. The balance is a function of the current in the solenoid circuit, and wide variations in the supply voltage do not affect the calibration. The current required for the operation of devices which I have built and tested is a small fraction of an ampere. When no measurement is desired the circuit may be opened to avoid waste of energy even though the device is subject to pressure without damage to the carbon pile. When the circuit is closed again the device almost immediately gives a measurement of the pressure or weight on the platform. Obviously the nature of the force applied to the upper end of the rod is immaterial. It may be a weight such as represented in Fig. 2, or it may be a force mechanically transmitted to the end of the rod, or the platform may be replaced by a flexible diaphragm for the direct measurement of fluid pressures, and such fluid pressures may be differentially applied to both sides of such diaphragm, as will be pointed out in explaining some practical uses to which my invention has been applied.

Fig. 3 represents a cross-section of a commercial pressure measuring device for measuring fluid pressures constructed in accordance with my invention. The device is cylindrical in shape and it will be understood that the section represented is taken through the center of the cylindrical shaped device. 20 represents the bottom of a tank containing a fluid, the pressure of which it is desired to measure. It will be understood that I speak of a fluid in its broad sense. Thus the tank may contain a gaseous fluid such as compressed air or a liquid such as gasoline. The particular device shown is proportioned and designed for measuring liquid pressures. The casing of the device comprises essentially two metallic parts 21 and 22 threaded together at 23. The part 21 is preferably of brass and is threaded into the tank 20 and the device is supported in this manner. The part 22 is of magnetic material and serves as a portion of the magnetic circuit of the device. To the lower end of the casing is secured an insulating chamber 24 the parts of which may be of molded insulating material. 13 is the coil of the solenoid. A flexible diaphragm 25 supported at its center by a disk platform 26 corresponds to the platform 11 of Fig. 2. The core or armature of the solenoid is an inverted cup-shaped magnetic part 27 which surrounds and rests directly upon the carbon pile. The carbon pile comprises a stack of carbon washers 28. The core 27 is secured in fixed relation with the platform 26 by the intermediate part 29 and a guide rod 30 threaded through the end of the cup-shaped core into the part 29. The rod 30 extends downward through a tube of insulating material 31 and a light adjustable spring 32 but its lower end is not supported except against lateral movement. The tube 31 is pressed on the rod 30. There is sufficient clearance between the tube 31 and the carbon washers and a lower platform 33 to prevent binding. The arrangement serves to maintain the parts in place and the carbon washers in proper alignment. It will be understood that a downward pressure on the flexible diaphragm 25 will be conveyed through parts 26, 29 and 27 to the top of the carbon pile and that the carbon pile will be compressed between parts 27 and 33. The platform 33 upon which the carbon pile rests is the top of a hollow metal plug which is threaded internally and externally as shown. A cup 34 is threaded into the bottom of the plug and this cup is insulated from but supports the spring 32. A spring arm 40 is secured to the bottom of cup 34 and serves as a handle for turning the cup 34 and adjusting the spring 32. The plug itself is adjustably threaded into a metal part 35 securely fastened in the insulated casing structure 24 and the insulated casing is in turn securely fastened to the metal casing structure 22. Thus it will be observed that the platform 33 is rigidly secured in fixed relation to the casing structure of the device but that by screwing the plug in or out, an initial adjustment of the exact position of the platform supporting the carbon pile may be made. The lower end of the insulating casing 24 is removable as indicated in order that such adjustments as have been mentioned can be made.

The magnetic circuit of the solenoid comprises, in addition to the cup-shaped core 27 already described, magnetic parts nearly surrounding the coil 13. These parts include the outer cylindrical shell of the casing part 22 and its bottom end portion 36 which extends to the inner periphery of the coil, an inner cylindrical magnetic part 37 secured to the bottom wall 36 of the casing and extending upward about two-thirds of the way to the top of the coil and a magnetic cover plate 38 secured in close magnetic connection at its outer edge with the casing 22 and extending just over the top outer edge of the core 27. Thus the magnetic circuit is closed except for the cylindrical air gap between the telescoping parts 27 and 37 and the narrow air gap between the top of the armature core 27 and the adjacent part 38. The magnetic pull between 27 and 37 is in a radial direction and is balanced on opposite sides of the core but the magnetic pull between part 38 and the core armature 27 is vertical. Thus when the coil 13 is energized the core armature 27 will be subjected to an upward magnetic pull.

The coil 13 and carbon pile are connected in series relation. One connection to the external circuit is made to the coil through binding post 150

41. The other side of the coil is connected to binding post 42. A metal strap 43 connects terminal 42 to the metal part 35 which is electrically connected to the bottom of the carbon pile through the platform plug 33. The only electrical connection between the platform 33 and the armature 27 is through the carbon pile. The armature core 27 is grounded to the casing through a flexible skeleton metal part indicated at 44 which serves in addition as a centering device for the diaphragm platform. Fig. 3c shows a plan view of the part 44. Part 44 does not exert any upward or downward pressure on the armature. The other terminal of the external circuit may therefore be fastened to any portion of the casing or tank 20 or to metal parts in contact therewith.

In a liquid pressure gauge such as a gasoline gauge I prefer to provide a plug 45 between the tank and the upper surface of the flexible diaphragm 25. This plug does not have a liquid-tight fit but allows the liquid in the tank to leak through slowly. This or an equivalent arrangement serves to damp sudden changes of fluid pressure such as would be caused by a splashing of the gasoline in the tank. It also serves to prevent appreciable loss of gasoline in case it is desired to disassemble the device by unscrewing the part 22 from 21 to change the diaphragm for example. After the parts are assembled a plug 46 is loosened to allow the air in the compression chamber or fluid weighing receptacle above the flexible diaphragm to escape and to allow this chamber to fill with the liquid from the tank. The liquid on the diaphragm prevents any inherent vibration or hunting action which would otherwise be present in this form of device. Thus liquid chamber serves as a damper and prevents sudden movements. The diaphragm is secured at the edges as illustrated and the diaphragm is of course made of some material impervious to the liquid or is treated to make it liquid tight. The area of the flexible diaphragm supported by the platform 26 will depend to some extent upon the pressure range of the device. This area may be changed by changing the size of the platform as illustrated in Figs. 3a and 3b. In Fig. 3a the effective diameter of the diaphragm is represented by D and in Fig. 3b it is represented by D'.

Having selected the proper area of diaphragm the device is assembled and connected in circuit, adjusted and calibrated with the instrument 16. The exact size of the air gap between the part 38 and armature core may be adjusted by turning or screwing the plug 33 in or out. If the current through the coil is too high with a given pressure I reduce the armature air gap slightly so as to give the solenoid greater pull for a given current. The zero adjustment is made by adjusting the spring 32. With zero pressure the weight of the armature and associated parts produces a slight compression of the carbon pile so a low value of current flows through the circuit. The extent of this initial compression may be adjusted by the spring 32 so that in calibrating the instrument an arbitrary zero indication is selected corresponding to zero pressure when a minimum current is flowing through the circuit. Such minimum current condition is above a current value where the apparatus becomes unstable in operation. After calibration I have found the device to be very accurate and to remain accurate in use.

It will be noted that the device is of compact and rugged construction. However, one of the features of the device which I consider of great importance as affecting its life and consistent accuracy is the fact that it has no moving parts as that expression is generally understood and by reason of the fact that practically all the balancing is done by the electromagnet which is an essentially reliable device. In practice the actual movement of the armature between maximum and minimum pressures does not exceed about 3 mils. Instead of appreciable movement of the parts we have a change in pressure on the carbon pile. It will thus be appreciated that there is no wear or movement of parts tending to alter the adjustment or calibration.

Another important advantage is that the device is independent of wide variations in voltage of the source of supply. This is illustrated in Fig. 4 showing curves plotted from test data showing the relation of current and voltage at different fluid pressures. In this figure the abscissa represents volts of the source of supply 15, the ordinates represent current through the circuit and the curves represent different inches of liquid head on the flexible diaphragm. It will be noted that above 10 volts there is no change in current with variations in voltage for a given pressure head. The reason for this is that after we obtain enough energy in the solenoid to balance the pressure its lifting action is responsive only to the current flowing through it. It is therefore desirable to employ a voltage which does not drop below about 10 volts with the particular device tested. The source of supply may be either direct or alternating current or rectified direct current. Where direct current is used it may be desirable in some cases to select a material for the magnetic circuit which has low hysteresis loss to avoid the possibility of a hysteresis lag tending to cause the calibration to be different for rising and decreasing currents. I have found that if ordinary annealed magnetic steel is used in the magnetic circuit this source of error is negligible. However this may be avoided entirely if alternating current is employed. Also, there may be some slight advantage in using alternating current or rectified current since the vibrations caused thereby will tend to maintain the carbon pile balance in a state of exact equilibrium and offset any tendency for the parts to stick or lag behind changing pressure conditions. If the device is properly constructed the condition just referred to is of little moment and where the gauge is used on an automobile or aeroplane sufficient vibration will be present to prevent any tendency of this character.

It has been pointed out that the operation of the device is independent of wide variations in the voltage of the source of supply. For the same reason the device is independent of changes in resistance of the coil 13 which might be caused by variations in temperature. However, the air gap between the armature 27 and part 38 may tend to vary slightly if there is a wide change in temperature of the device such as to cause an unequal expansion and contraction of the parts. In general, an expansion of the armature and associated parts tending to reduce the air gap will be accompanied by a corresponding expansion of the casing 22 in the same direction tending to enlarge the gap so that the resultant effect is ordinarily negligible on the calibration. However, by making the air gap large enough any slight change due to an unequal expansion or contraction of the parts does not noticeably influence the calibration. This is a point that should receive consideration and may be taken care of in the design of the instrument.

In Figs. 5 and 6 I have represented different sectional views of a device embodying my invention which is of somewhat simpler construction than the device of Fig. 3 but operates upon the same principle. The casing is provided with a fluid receptacle part 50 having a threaded extension for connection to the fluid pressure system. This connection will have a restricted opening so that the receptacle acts as a damper as previously explained. A part 51 has its outer edge bent around the outer edge of part 50 clamping the flexible diaphragm 25 between them. A removable metal cover 52 completes the casing structure. In certain applications the casing should be made liquid tight. The solenoid coil 13, the carbon pile 28 and the associated parts are supported from a steel member 53 securely fastened to an inwardly extending rim on the casing part 51 at three points 54. The coil 13 has a core 55 secured to the steel part 53 and to a lower magnetic section 56. A tongue on part 53 is bent downward at 57 and forms a part of the magnetic circuit and also serves to support the carbon pile as indicated in Fig. 5. The armature of the solenoid is shown at 58. It is pivotally supported to member 56 at 59 and its opposite end has a turned-up part closely adjacent to the lower end of the tongue 57 forming a narrow air gap across which the flux of the solenoid passes to create the desired balancing pull of the device.

The pressure on the flexible diaphragm is conveyed to the top of the carbon pile through a pin 60, a member 61, an adjusting nut 62, a rod 63 and an insulating member 64. The member 61 is rigid but is flexibly supported by a thin metal strip 65 having an end clamped at 54. The insulating member 64 is secured to rod 63 and although the insulating member extends down through the carbon pile and the lower supporting plate therefor, there is sufficient clearance around the tubular portion of the insulating member to prevent binding or sticking. The upward pull of the solenoid is conveyed to rod 63 through the strap 66 secured to the armature 58 and an adjustable nut 67.

It will now be seen that when pressure is applied to the flexible diaphragm it is conveyed downward on the carbon pile and on the pivoted armature member 58 and that the upward pull of the solenoid is in a direction to balance such downward force. The carbon pile and coil are connected in series with an external indicating instrument and source of supply as indicated in Fig. 6. Connections to the top and bottom of the carbon pile are through conductor terminal washers indicated at 68.

Zero adjustment is made by adjusting a spring 69 which gives a slight upward pull on arm 66. The air gap adjustment is made by turning the nut 67. The cover may be removed without disturbing the assembled parts when making such adjustments. The device of Fig. 5 is somewhat simpler in mechanical construction as compared with the device of Fig. 3 but the main advantage is that it permits the use of a coil containing considerably less copper owing to the decrease in its diameter. The magnet air gap may also be adjusted without disturbing the vertical adjustment of the diaphragm permitting the use of a metal diaphragm. The device of Fig. 5 may of course have the effective area of the diaphragm changed and it may be employed for the measurement of differential pressures. Its operation requires substantially no movement of the parts.

In the devices shown in Figs. 3 and 5 it will be noted that the cover is provided with a plug 97. When the device is employed to measure the pressure corresponding to the height of liquid in a tank the lower surface of the flexible diaphragm should be exposed to atmospheric pressure since the upper surface of the liquid in the tank will also ordinarily be exposed to atmospheric pressure. If the casing of the instrument is made liquid-tight or air-tight so that it may be used to measure differential pressures the plug 97 will fit sufficiently loose that the interior of the casing below the flexible diaphragm will be at atmospheric pressure. The interior construction of the device will be such that the lower side of the flexible diaphragm and the inlet 97 are connected by a passageway through which a gas or a liquid may flow. When it is desired to use the device for the measurement of differential pressures, as will be explained in connection with Fig. 11, the plug 97 is removed and is replaced by a pipe communicating with the lower of the two differential pressures to be measured. The plug 97 may of course be placed at any convenient point in the casing on the low pressure side of the flexible diaphragm.

Fig. 7 represents the application of my invention to the measurement of the amount of fuel in the fuel tanks of an aeroplane. 70, 71 and 72 represent the tanks, 73, 74 and 75 represent my combined pressure balancing and regulating units. One indicating instrument with a transfer switch 76 and one source of supply suffice for the installation. The instrument is connected to indicate the fuel in tank 72. The illustration indicates that the tanks are of different size and depth. The instrument 16 will therefore preferably have three scales, one for each tank, each scale being calibrated with its corresponding pressure balancing unit and tank. The switch 76 will ordinarily be open and closed only when a reading is desired. This feature of my device is important in this application and it insures a dead circuit at all times except when the pilot wishes to read his gasoline supply, thereby preventing the unnecessary consumption of electrical energy and overcoming any chance of fire from broken wiring in the event of a crash. The absence of piping in connection with the fuel measuring system is also a considerable advantage. The average weight of a pressure balancing unit of the form shown in Fig. 3 is about two pounds. The average weight of a unit of the type shown in Fig. 5 is about one pound. The above features, together with reliability and accuracy, are particularly important in aeroplane service.

Fig. 8 illustrates the application of my invention to apparatus for measuring and recording wind velocity. The apparatus is essentially a wind vane with one of my pressure balancing regulating units in its forward end arranged to be subjected to the wind pressure and its circuit connected to an oscillograph. A light hollow tubular body 77 is pivoted on a vertical axis like a wind vane so that the end 78 will face the wind when the apparatus is mounted on top of a building, or other exposed structure. The front end of the vane is loosely hinged near the top at 79 and its center is secured to a rod 80 the rear end of which rests against a platform 81 of the character employed to support the flexible diaphragm in the other modifications of my device. The electric pressure balancing and regualting unit itself may be constructed similar to that shown in Fig. 3 but the central rod 82 is extended to the rear where it is secured to a damping device the details of which are shown in Fig. 9. This damper is a chamber having flexible diaphragms 83 at front and rear secured to the rod 82. The chamber is filled with a viscous liquid. Inside the chamber the rod carries vanes 84 and extending inwardly from the walls of the chamber is a vane 85. This device is a common form of damper and serves to prevent inherient vibratory or hunting tendencies. It serves the same purpose as the liquid on the diaphragm in Figs. 3 and 5. The electrical circuit of the unit is connected in series with a source of supply and an oscillograph represented at 86. One side of the circuit is connected through a brush 87 and a stationary slip ring 88 on the vertical axis of rotation. The other side of the circuit is grounded to the metal framework. The oscillograph itself may be located inside a building some distance from the remainder of the apparatus and connected electrically therewith as shown.

Fig. 10 shows a reproduction of an oscillograph record of wind velocity taken on a windy day by the apparatus just described. Curve 89 is the wind velocity record and curve 90 is a time record, the distance between vertical lines representing seconds. Before taking this record the apparatus was carefully calibrated in a wind tunnel. It will be noted that the zero current line is slightly below the zero wind pressure line.

Fig. 11 represents the application of my invention to an indicating flow meter for indicating the rate of flow of gases in a conduit 91. The pressure balancing and regulating unit indicated at 96 may be of a form shown in either Figs. 3 or 5. The flexible diaphragm is subjected to the differential pressure on opposite sides of an orifice 92. The pipe 93 on the high pressure side of the orifice connects to the compression chamber of the unit 96 in the same manner as it was connected to the tank in Fig. 3. The plug 97 shown in the bottom wall of the device of Fig. 3 is removed and replaced by a pipe 94 connected to conduit 91 on the low pressure side of the orifice 92. To keep water and the like out of the unit I prefer to completely fill the casing of the unit with oil. Oil is also contained in the pipes 93 and 94 to a level above the casing such as indicated by the dotted line 95. The casing of the unit for such applications must be liquid-tight and the interior so constructed that the pressure in pipe 94 will be conveyed to the low pressure side of the diaphragm. I have found that completely filling the casing with oil does no harm nor does it adversely influence the operation of the device. In fact, some experiments seem to indicate that filling the casing with oil is beneficial.

With the arrangement described it will be evident that opposite sides of the flexible diaphragm 25 (see Fig. 3) will be subjected to the pressures occuring on opposite sides of the orifice 92 and that a force proportional to the difference in such pressures will be conveyed to the electromagnet pressure balancing and regulating unit. The electrical measuring instrument connected in the circuit will then be calibrated with the apparatus in terms of the rate of flow of the fluid in conduit 91.

In Fig. 12, as described in my application Serial No. 301,018, the device is represented as arranged for the measurement of a fluid in a tank 100 which is connected with the measuring device by the sylphon 101, supporting plate 102 and rod 103, the latter supporting the weight of the liquid and transmitting the pressure of the fluid through the magnetic field to the carbon pile 104 which is used as a variable resistance. The electromagnet 105 is used to provide the magnetic field. The armature 106 of the electromagnet is connected to the rod 103 so that any lifting force acting on the armature of the electromagnet is converged to the rod 103.

A battery or other electric source 15 is used to supply the necessary electric current for the device. The battery, the carbon pile, the electromagnet and ammeter 16, which is used as an indicator, are connected in series. As the pressure on the receptacle is increased it is transmitted by rod 103 to the carbon pile. Thus, as the pressure on the carbon pile is increased, the resistance is decreased allowing a greater amount of current to flow in the circuit. The increase of current increases the strength of the electromagnet, thus increasing the force exerted on the armature of the electromagnet which is attached to the rod transmitting the pressure of the fluid. The force on the armature is in opposition to the force due to the pressure of the fluid that is being transmitted by rod 103. Thus the increase of pull on the armature tends to decrease the pressure on the carbon pile. As the pressure is decreased the resistance is increased, thus weakening the strength of the electromagnet. As the pressure of the fluid is varied, the resistance at 104 is varied, the resistance being increased or decreased according to the increase or decrease in pressure of the fluid. Thus the strength of the electromagnet is always proportional to the pressure of the fluid. There are two forces that support the pressure of the fluid; namely the supporting force due to the electromagnet and a supporting force due to the spring effect of the carbon pile, but the supporting force of the carbon pile is very small compared to the supporting force due to the electromagnet, so any change in the pressure resistance characteristic of the carbon pile will produce only a small change in the force required by the electromagnet to support the pressure of the fluid. Consequently the current strength through 16 is substantially proportional to the pressure applied and in any event the instrument 16 may be accurately calibrated with the apparatus.

Damping devices as shown in Fig. 13 are screwed to rod 103 at positions 107 and 108 and are held firmly in place by nuts 110 and 111. Each damping device is covered both top and bottom with flexible material 83 and is filled with a very viscous substance. The diagram Fig. 9 shows a sectional view of the damping device, indicating stationary and movable projections 85 and 84 which tend to check the flow of the viscous substance. It will not flow freely when the device is in any position. When there is a steady pressure on rod 103 it will not be necessary to use the damping device but where the pressure is unsteady, as for example where the device is used as a fuel gauge on an aeroplane or automobile without the restricted passage and compression chamber as explained in connection with Fig. 3, the pressure on the supporting means will change due to the movement of the container and also there will be a natural tendency of the device to hunt. In such cases I have found it desirable to use the damping device to prevent oscillation.

A suitable frame is used for the support of the measuring device. Two stationary rods 112 and 113 are used to fasten the crossbars 114, 115 and 116. Bar 114 is used to hold the sylphon in a steady and correct position. Crossbar 115 serves the double purpose of being a support for the electromagnet and also for holding the damping device at 107 in the desired position. Crossbar 116 is used as a support for the damping device at 108.

As may be noted from the drawing of Fig. 12, the electrical circuit is entirely separated from the substance being weighed, or measured. The circuit is not broken at any time and the indicator may be placed in any desired position.

In accordance with the provisions of the patent statutes I have described the principle of operation of my invention and various forms and uses thereof. Other forms and uses of the invention will occur to those skilled in the art and I do not wish to limit my invention to the particular forms and uses hereinbefore described but seek to cover in the appended claims all forms of the invention and all uses thereof which fall fairly within the true spirit and scope of my invention.

What I claim as new and desire to secure by Letters Patent of the United States, is,—

1. A combined pressure balancing and regulating unit for controlling the flow of current in an electric circuit in response to variations in a pressure to be measured comprising a cylindrical casing divided into two compartments by a flexible diaphragm, an opening into one of said compartments for exposing one side of the flexible diaphragm to the fluid pressure to be measured, the other compartment containing a platform supporting the central portion of the flexible diaphragm, a carbon pile resistance subject to compression by the fluid pressure force acting through said diaphragm on said platform, and an electromagnet connected in series with the carbon pile and having an armature subject to the magnetic pull of the electromagnet opposing the compression force acting on the carbon pile, said platform being removable in order that it may be replaced for another of different size to adapt the unit for the measurement of different fluid pressures.

2. A combined pressure balancing and regulating unit for controlling the flow of current in an electric circuit in response to pressure differences to be measured, comprising a fluid-tight casing divided into two compartments by a flexible diaphragm, conduit openings into the two compartments of said casing for connection to different pressure fluid systems to expose the opposite side of said diaphragm to the pressures thereof, a carbon pile resistance in the compartment on the low pressure side of said diaphragm compressed in response to the difference in pressure on the two sides of said diaphragm, and an electromagnet having its energizing winding connected in series with said carbon pile and having an armature mechanically associated with the carbon pile and diaphragm so as to oppose such difference in pressure when said electromagnet is energized.

3. A combined pressure balancing and regulating unit for controlling the flow of current in an electric circuit in response to pressure variations to be measured comprising a casing, a flexible diaphragm dividing the casing into two compartments, means for connecting one compartment to a fluid pressure system so as to expose the flexible diaphragm to the pressure thereof, a platform in the other compartment supporting the central portion of said diaphragm, a carbon pile resistance and an electromagnet connected in series in an electric circuit and supported in the last mentioned compartment adjacent to said platform, an armature for said electromagnet connected to said platform so that it opposes the pressure from the fluid pressure system when the electromagnet is energized, and means operated by said connection for compressing the carbon pile when the fluid pressure exceeds the electromagnet opposing force.

4. A combined force balancing and regulating unit for controlling the flow of current in an electric circuit in response to variations in a force to be measured comprising an electromagnet having a magnetic circuit including an armature member, said magnetic circuit containing an air gap adjacent the armature across which a magnetic pull is created when the electromagnet is energized tending to move the armature in a given direction, means connected to said armature and acted upon by a force to be measured tending to move said armature in the opposite direction, an abutment secured in fixed relation to said electromagnet, an abutment secured in fixed relation to said armature, a carbon pile between said abutments connected in series with the electromagnet, the relation being such that the carbon pile is compressed when the force to be measured exceeds the magnetic pull of the armature, the movement of the armature being small as compared to the armature air gap.

JOHN H. PAYNE.